Sept. 20, 1932.　　　E. L. CACHE　　　1,878,375
POWER TRANSMISSION FOR MOTOR ROAD VEHICLES AND THE LIKE
Filed Aug. 19, 1931
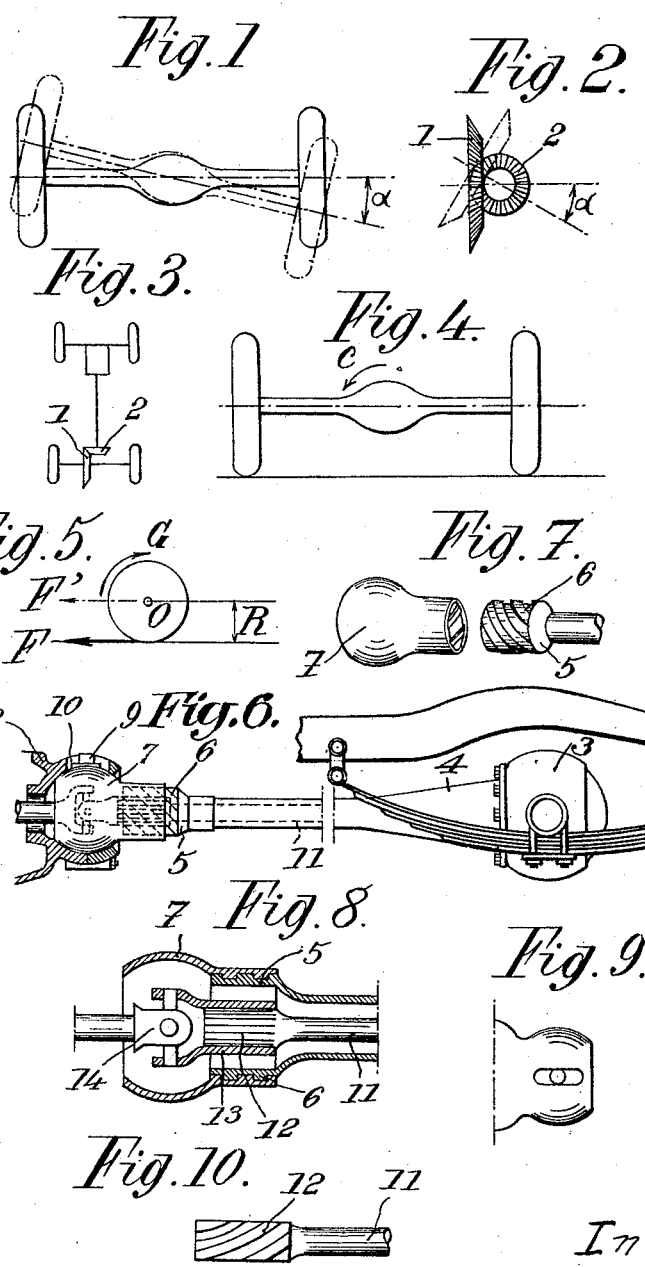
Inventor:
Edmond Louis Cache
By Emil Bönnelycke
　　　Attorney Patented Sept. 20, 1932

1,878,375

UNITED STATES PATENT OFFICE

EDMOND LOUIS CACHE, OF ST.-QUENTIN, FRANCE

POWER TRANSMISSION FOR MOTOR ROAD VEHICLES AND THE LIKE

Application filed August 19, 1931, Serial No. 558,154, and in France September 8, 1930.

At present most motor cars comprise a longitudinal transmission shaft and a geared back axle, perpendicular to said shaft and located in a rigid casing supporting the rear wheels. The geared back axle, whatever may be its design (bevel gear, worm gear, hyperbolic gear, etc.) always has the following drawback.

Assuming, for instance, that in passing over an unevenness of the road, one of the driving wheels is lifted more than the other (Fig. 1). The casing of the back axle is then angularly deplaced through an angle $\alpha$, relatively to the longitudinal axis of the car and to the axis of the transmission shaft.

For a transmission gear with bevel pinions (Fig 2) the displacement of the casing provokes a sudden rotation of bevel pinion 1 relatively to pinion 2 from the position shown in full lines to that shown in dotted lines. This movement accelerates the rotation of pinion 2 and the elements of the motor connected therewith. One the other hand and due to the inertia of said elements, the bevel pinion 1 receives an acceleration in an opposed direction and this acceleration is transmitted to the elements kinetically connected to with said bevel pinion 1, i. e., the mass of the vehicle. The absolute values of said accelerations are in inverse ratio to the inertias which must be considered in the two cases.

Thus a difference between the level of one of the rear wheels, with regard to the other, produces a disturbance in the transmission which manifests itself by a longitudinal shock. This latter is injurious to the driving mechanism and the tyres and is unpleasant for the users of the car.

To avoid this drawback, it has been proposed to utilize a suspended differential gear with separate transmissions for each of its driving wheels. This construction is complicated and costly.

The present invention has for its object to provide a structure which avoids these disadvantages, which can be easily mounted on cars of the ordinary type with a geared back axle and single transmission and which improves the suspension.

It consists, principally, in providing a transmission for motor cars and the like in which the driving axle may move forward and backward relatively to the whole of the vehicle said movement depending upon the angular displacement of the axle perpendicularly to the longitudinal axis of the vehicle so as to compensate the effects produced on the driving torque by an unevenness of the road.

Another object of the invention is to provide a structure in which the forward and the backward movement is proportional to the angular displacement of the axle so that its resulting movement is a helicoidal one in a direction parallel to the longitudinal axle of the vehicle.

For a motor car of the usual type, shown schematically and in plane on Fig. 3, the direction of the helix is right-handed.

The optimum value of the pitch of said helicoidal line is given by the relation:

$$(1) \quad p = \frac{D}{K}$$

$D$ being the development of the driving pinions and $K$ the gear ratio or the ratio between the number of teeth of the driven and the driving pinion.

The preceding relation is demonstrated in the following manner.

An inclination $\alpha$ of the rear axle casing corresponds to a rotation $\alpha$ in the opposite direction of the driving pinion. For such a rotation of said pinion a forward movement of the car is obtained having an amplitude of:

$$(2) \quad a = \frac{\alpha}{2\pi} \times \frac{D}{K}$$

If the casing of the geared back axle can freely advance over a length corresponding to $a$, there will be no shock or, at least, the shock will be reduced considerably, because the acceleration acts only on said casing and not on the whole mass of the vehicle.

If the casing effects the helicoidal movement, in accordance with the conditions stated above, it will advance with an amplitude corresponding to:

$$(3) \quad p \times \frac{a}{2\pi}$$

In order that this amplitude will be equal to $a$, it is necessary and sufficient to have $$(4) \quad p = \frac{D}{K}$$

which is the solution given under (1).

This transmission gives rise to another advantage relative to the distribution of load on the two rear wheels.

Indeed, a car with an ordinary geared rear axle has another disadvantage which is the following.

The load on said rear axle is unequally distributed on the two rear wheels with a difference varying with the acceleration transmitted by the driving torque (Fig. 4) to the driving pinions of the differential. As said torque varies, the load on each of the rear wheels changes accordingly and, if the variation of the torque is very rapid, as occurs by a sudden decrease of speed, it is sufficient, on a slippery road, to provoke skidding of the car.

This drawback is aggravated by using the lower speeds of the gear box because the torque is then notably increased.

The present invention avoids this drawback by creating a torque $C'$ which, friction effects being neglected, compensates exactly the disturbing torque $C$.

Indeed, to said torque $C$, acting on the transmission shaft, correspond, on the spokes of the rear wheels and the ground, two horizontal reacting forces having a resultant $F$ given by the relation.

$$(5) \quad F = \frac{K.C}{R}$$

$R$ being the radius of the loaded wheel (Fig. 5). $F$ can also be given by $$F = 2\pi \frac{K.C}{D}$$

$F$ being thus the force which causes the advance of the car. When $F$ is transferred at $O$, which is the central point of the geared rear axle (Fig. 5), a force $F'$ is obtained, equal to the force $F$ and a torque $G$ is thus formed, generally termed "prancing torque." This force $F'$, acting in the direction of the helicoidal movement, creates a reacting torque $C'$ on the guiding means for such a movement.

The relation between $F'$ and $C'$ is obtained by rendering the work of the force $F'$, for a displacement arbitrarily chosen, equal to that of the reacting torque $C'$ when the angular displacement corresponds to the amplitude chosen for $F'$.

Assuming the displacement of the force $F$ corresponds to the pitch $p$ of the helicoidal movement, which corresponds, for the torque $C'$, to a rotation of $2\pi$, the equality of the acting and the reacting loads will give.

$$F'p = -2\pi C' \quad \text{or} \quad Fp = -2\pi C'$$

Introducing $F$ in formula (6), we will have $$2\pi \frac{KC}{D} \times p = -2\pi C' \quad \text{or} \quad \frac{KC}{D} \times p = -C'.$$

The pitch is given by formula (1)

$$p = \frac{D}{K} \quad \text{thus} \quad \frac{KC}{D} \times \frac{D}{K} = -C' \quad \text{or} \quad C = -C'$$

The changes in load on the rear wheels, resulting from the variations of the driving torque, are thus completely eliminated.

The forward and backward movements of the casing of the geared rear axle, and more specially the helicoidal movement referred to, may be obtained in different ways without departing from the spirit of the invention.

The invention will be more clearly understood by a reading of the description now to be given with reference to the accompanying drawing, in which:

Figure 1 is a diagram showing displacement of the driving wheels of a vehicle moving over uneven ground.

Figure 2 is a diagram showing the relative movement of certain of the differential pinions during displacements of the type represented in Figure 1.

Figure 3 is a diagram showing a general driving assembly.

Figure 4 is a diagram showing the direction of the driving torque under certain conditions of operation.

Figure 5 is a force diagram showing the torque acting on a driving wheel.

Figures 6 to 10 of the accompanying drawing show, by way of example, two different forms of the invention.

Figure 6 is a sectional elevation of the whole of a transmission gear, according to one form of the invention.

Figure 7 shows, in perspective, the helicoidal coupling means.

Figure 8 is a longitudinal section of said coupling means.

Figure 9 is a plan view of the thrust abutment.

Figure 10 is an elevation of an element of the structure shown on Figures 6 to 9 but in modified form.

The casing 3 of the geared rear axle is mounted, in the ordinary manner, on a tubular conical element 4, whose anterior extremity is provided with a head 5 with helicoidal threads 6 having a pitch given by the relation $$(1) \quad p = \frac{D}{K}$$

Said threads are engaged in a corresponding screw member provided on the posterior side of the thrust abutment 7 which is mounted on the casing 8 of the gear box.

The abutment 7 is constituted by an enclosed ball joint and comprises means, i. e. a pin 9 engaged in a groove 10 of its housing, to prevent rotation of the ball with the transmission shaft 11 (Fig. 9).

The shaft 11 (Fig. 8) may slide, by means of longitudinal grooves 12 provided in a sleeve 13 mounted on the ordinary universal joint 14.

The device, described above, functions as follows: If, in passing over an unevenness of the road, the tubular element 4, attached to casing 3, turns around the transmission shaft 11, the head 5 penetrates into the screw number of the ball-abutment 7 according to the helicoidal movement defined above. The rear axle and its casing 3 follow the movement of the head 5. The transmission shaft 11 slides axially in the sleeve 13 without interrupting the driving action owing to the action of the longitudinal grooves 12.

Said grooves 12 may also have a helicoidal form as shown on Fig. 10, the pitch $p'$ being necessarily different from pitch $p$. In this case, the optimum condition for helicoidal movement of the transmission shaft is the following. The pitches $p$ and $p'$ are designated with the sign $+$ if they are right handed and with the sign $-$ if they are left-handed.

The same reasoning can be applied as above, by considering that the advance of the casing 3

$$(7) \quad a = \frac{\alpha}{2\pi} \times p$$

causes an angular displacement of the driving pinions of the differential $$(8) \quad \beta = 2\pi \frac{a}{p}$$

which must be deducted from the relative rotation $\alpha$.

The rotation $$\frac{\alpha - \beta}{K}$$

of the driving pinions must be equal to the advance $a$ and $$(9) \quad a = D\frac{\alpha - \beta}{2\pi K}$$

If $\alpha$ and $\beta$ are eliminated in the relations (7) (8) and (9) the general condition $$(10) \quad \frac{1}{p} - \frac{1}{p'} = \frac{K}{D}$$

is obtained.

If $p'$ has an infinite value (longitudinal grooves), the condition $$p = \frac{D}{K}$$

is obtained again.

It is to be noted that, generally, the pitch $p$ must have a value chosen in the "reversing zone" and the pitch $p'$ a value chosen in the "non-reversing zone."

Although the longitudinal grooves may be machined with greater ease, it may be advantageous to adopt helicoidal grooves, especially if a complete compensation of the driving torque must be obtained, the friction effects being thus eliminated as much as possible. It suffices, in this case, to substitute the helicoidal grooves having a pitch $\frac{D}{K}$ and a mean inclination by grooves having a pitch:

$$(11) \quad p = \frac{D}{K}\frac{tg(\theta + \varphi)}{tg\theta}$$

$\varphi$ being the friction angle and $\theta$ the angle made by the pitch line of the helicoidal grooves with a plane perpendicular to the axis of the transmission shaft.

The pitch $p'$ of the grooves, provided in the transmission shaft can then be determined by the relation (10).

When using a transmission device, as above described, it is necessary to provide a suitable connection between the casing of the geared rear axle and the underframe of the car so as to allow the translating movement or the combined translating and rotating movement of said casing.

In the case of a simple translating movement, the casing of the geared rear axle proper, the connection of the springs to the underframe of the car and to said casing undergo no modification. In the case of the combined movement, the anterior end of the tubular element 4 may be attached to the underframe by means of a screw connection similar to that described above or by equivalent device.

What I claim is:

1. In a road vehicle comprising an underframe, a geared rear axle, a shaft in driving relation thereto, means for supporting said axle by said underframe and means allowing a relative movement of said supporting means relatively to said underframe in the direction of the axis of said shaft, under the effect of the angular displacement of said axle in a plane perpendicular to said shaft.

2. In a road vehicle comprising an underframe, a geared rear axle, a shaft in driving relation thereto, means for supporting said axle by said underframe and means allowing a sliding movement of said supporting means relatively to said underframe parallelly to the axis of said shaft under the effect of the angular displacement of said axle in a plane perpendicular to said shaft.

3. In a road vehicle comprising an underframe, a geared rear axle, a shaft in driving relation thereto, means for supporting said axle by said underframe and means allowing a helicoidal movement of said supporting means relatively to said underframe, parallelly to the axis of said shaft, under the effect of the angular displacement of said axle in a plane perpendicular to said shaft.

4. In a road vehicle comprising an underframe, a geared rear axle, a casing surrounding said axle and mounted on said underframe, a shaft in driving relation with said axle, a supporting element for said shaft attached to said casing and mounted on said underframe, and supporting means for said casing and said supporting element operative to permit a displacement of said casing and said supporting element relatively to said underframe in the direction of said shaft.

5. In a road vehicle comprising an underframe, a geared rear axle, a shaft in driving relation with said axle and comprising two parts slidably connected in axial direction, a casing surrounding said axle and said shaft, and mounted by its posterior end on the underframe, helicoidal grooves in the forward end of said casing, and a screw-like element engaged on said forward end and rigidly mounted on said underframe.

6. In a road vehicle comprising an underframe, a geared rear axle, a shaft in driving relation with said axle and comprising two parts slidably connected in axial direction by a screw-like connection, a casing surrounding said axle and said shaft and mounted by its posterior end on the underframe, a helicoidal grooves in the forward end of said casing, a screw like element engaged on said forward end and rigidly mounted on said underframe, the pitches of said screw-like connection and of said helicoidal grooves being different.

In testimony whereof I affix my signature.

EDMOND LOUIS CACHE.